United States Patent
Swerup et al.

(10) Patent No.: US 7,054,440 B2
(45) Date of Patent: May 30, 2006

(54) METHOD AND APPARATUS FOR KEYPAD REPRESENTATION IN A MOBILE COMMUNICATION DEVICE

(75) Inventors: Jan Swerup, Knivsta (SE); Leif Nilsson, Täby (SE); Bo Lindell, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 621 days.

(21) Appl. No.: 09/976,834

(22) Filed: Oct. 12, 2001

(65) Prior Publication Data
US 2002/0177464 A1    Nov. 28, 2002

Related U.S. Application Data

(60) Provisional application No. 60/293,206, filed on May 23, 2001.

(51) Int. Cl.
*H04M 1/00* (2006.01)

(52) U.S. Cl. ............... 379/433.06; 379/433.07; 379/368; 455/550.1

(58) Field of Classification Search ............ 455/550.1, 455/551, 556.1, 556.2, 557, 558, 128, 566, 455/564, 565, 575.1, 575.3, 575.4, 575.8; 345/168, 173; 379/433.07, 433.06, 433.13, 379/368
See application file for complete search history.

(56) References Cited

U.S. PATENT DOCUMENTS

| | | | |
|---|---|---|---|
| 5,189,632 A | 2/1993 | Paajanen et al. | 364/705.05 |
| 5,584,054 A * | 12/1996 | Tyneski et al. | 455/566 |
| 5,715,524 A * | 2/1998 | Jambhekar et al. | 455/575.3 |
| 5,797,089 A | 8/1998 | Nguyen | 455/403 |
| 5,987,310 A * | 11/1999 | Gray | 455/575.6 |
| 6,038,313 A * | 3/2000 | Collins | 379/433.07 |
| 6,373,397 B1 * | 4/2002 | Song | 340/815.4 |
| 6,445,932 B1 * | 9/2002 | Soini et al. | 455/556.1 |
| 6,526,296 B1 * | 2/2003 | Nieminen | 455/575.3 |
| 6,542,721 B1 * | 4/2003 | Boesen | 455/553.1 |
| 6,549,789 B1 * | 4/2003 | Kfoury | 455/550.1 |
| 6,571,086 B1 * | 5/2003 | Uusimaki | 379/368 |
| 6,587,675 B1 * | 7/2003 | Riddiford | 455/557 |
| 6,630,925 B1 * | 10/2003 | Ostergård et al. | 345/168 |
| 6,704,417 B1 * | 3/2004 | Kim | 379/433.07 |
| 6,798,882 B1 * | 9/2004 | Kupiainen | 379/433.07 |

FOREIGN PATENT DOCUMENTS

| | | |
|---|---|---|
| EP | 0 933 908 A2 | 8/1999 |
| WO | WO-97/41677 A1 | 11/1997 |
| WO | WO 00/69033 | 11/2000 |
| WO | WO-00/79772 A1 | 12/2000 |
| WO | WO-01/75580 A2 | 10/2001 |

OTHER PUBLICATIONS

English abstract for JP 10065784 A; published Mar. 6, 1998.

* cited by examiner

*Primary Examiner*—Jefferey F. Harold

(57) ABSTRACT

In a method and apparatus for assigning the values or functions to be represented by the keys of a keypad in a mobile communication device, the keys are capable of representing different values or functions based on the occurrence of a predetermined event. A detector is used to detect the occurrence of the event. Depending on whether the event is detected, the keys are assigned to represent a different set of values or functions.

30 Claims, 4 Drawing Sheets

METHOD AND APPARATUS FOR KEYPAD REPRESENTATION IN A MOBILE COMMUNICATION DEVICE

CROSS REFERENCE TO RELATED APPLICATION

The present application for patent is related to, claims priority from, and incorporates by reference the subject matter disclosed in U.S. Provisional Application No. 60/293,206, entitled "Browserphone with Flip," filed May 23, 2001 with the U.S. Patent and Trademark Office.

BACKGROUND

1. Field of the Invention

The present invention is related to mobile communication devices and, more particularly, to a method and apparatus for representing the keys of a keypad in a mobile communication device.

2. Description of the Related Art

Mobile communication devices, such as smart phones, smart pagers, personal digital assistants, and the like, can be used for both telephony applications as well as computing and networking applications (e.g., via the Applications Protocol). Some of these mobile communication devices typically include a cover lid having a keypad with a plurality of keys thereon. When the cover lid is closed, the keys can be used to dial telephone numbers, receive a call, and to perform other telephony related functions. Flipping open the cover lid uncovers a touch screen and puts the mobile communication device into the computing and networking mode wherein a variety of applications such as Web browsing, sending e-mail, and surfing the Internet may be performed.

Unfortunately, when the cover lid is in the open position, the keypad faces away from the user, making it difficult for the user to use the keys for browsing or other computing and networking applications. For one thing, the user is required to blindly reach around the other side of the cover lid in order to press the keys. Even assuming the user manages to press the desired key, the expected functions and values represented by the keys have been transposed relative to when the cover lid is closed. For example, when the cover lid is open, the navigation key that the user intuitively expects to be the Up key is actually the Down key.

One way of overcoming the above difficulty is to display the needed keys directly on the touch screen when the mobile communication device is in the browsing mode. The user may then touch the appropriate touch screen key to achieve the desired function or value. A different set of touch screen keys may be presented to the user depending on the particular mode or application being used. However, the touch screen on most mobile communication devices is limited in size. It is therefore preferable to be able to use as much of the touch screen area as possible to display information instead.

Accordingly, it is desirable to be able to provide an improved method and apparatus for representing the keys in a keypad in a mobile communication device.

SUMMARY OF THE INVENTION

The present invention provides an improved method and apparatus for representing the keys of a keypad in a mobile communication device. The keys are capable of representing different values or functions based on the occurrence of a event. A detector is used to detect the occurrence of the event. Depending on whether the event is detected, the keys are assigned to represent a different set of values or functions.

In general, in one aspect, the invention is related to a method of assigning functions to be represented by the keys of a keypad on a cover lid of a mobile communication device. The method comprises detecting whether the cover lid is in a first position or a second position, assigning a first set of functions to be represented by the keys when the cover lid is detected in the first position, and assigning a second set of functions to be represented by the keys when the cover lid is detected in the second position.

In general, in another aspect, the invention is related to a mobile communication device having a keypad and keys mounted on a cover lid. The mobile communication device comprises a memory unit capable of storing a first set of functions and a second set of functions to be represented by the keys, and a detector unit capable of detecting a movement of the cover lid from a first position to a second position. A control unit is connected to the memory unit and the detector unit. The control unit is configured to assign the first set of functions to the keys when the cover lid is detected in the first position, and to assign the second set of functions to the keys when the cover lid is detected in the second position.

In general, in still another aspect, the invention is related to a keypad for a mobile communication device. The keypad comprises a plurality of mechanical keys mounted on the keypad and capable of performing a first set of functions and a second set of functions. The plurality of mechanical keys are configured to perform the first set of functions when a predetermined event has not occurred, and to perform the second set of functions when the predetermined event has occurred.

BRIEF DESCRIPTION OF THE DRAWINGS

A more complete understanding of the present invention may be had by reference to the following detailed description when taken in conjunction with the accompanying drawings, wherein.

DETAILED DESCRIPTION OF THE DRAWINGS

Figure 3:
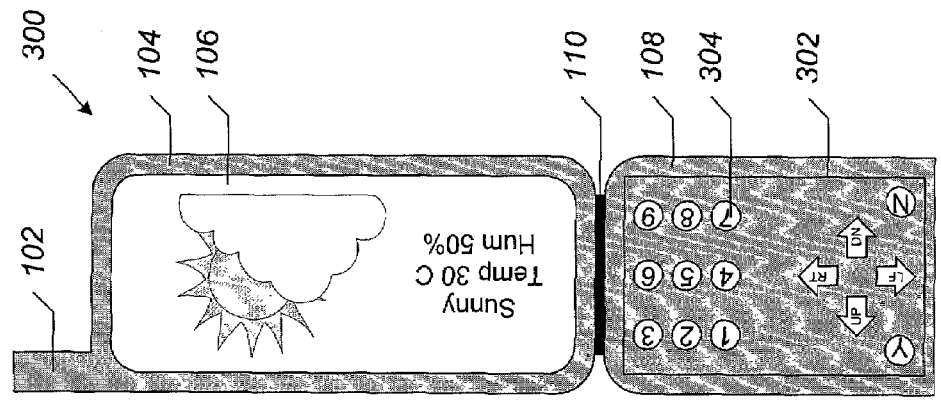
FIG. 3 illustrates another mobile communication device according to some embodiments of the invention.

Following is a detailed description of the drawings wherein reference numerals for like and similar elements are carried forward.

Embodiments of the invention provide an improved method and apparatus for representing the keys of a keypad in a mobile communication device. In some embodiments, the invention is directed to a mobile communication device having a keypad and a plurality of keys mounted thereon. A detector unit detects whether a predetermined event has occurred and provides an appropriate output signal to a control unit of the mobile communications device. A memory unit of the mobile communication device stores the values or functions that are to be represented by the keys. The stored values or functions are assigned to the keys by the control unit based on whether the predetermined event has occurred.

Figure 1:
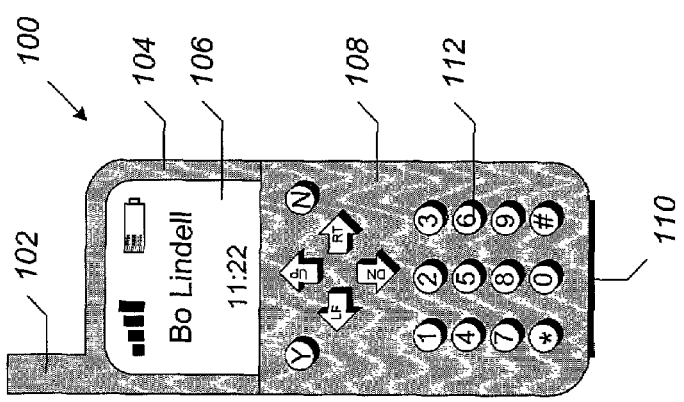
FIG. 1 illustrates a mobile communication device according to some embodiments of the invention.

Referring now to FIG. 1, an exemplary mobile communication device 100 according to some embodiments of the invention is shown. The mobile communication device 100 may be a smart phone, smart pager, personal digital assistant, and the like, that can be used for wireless telephony and computing and networking. An antenna 102 on the mobile communication device 100 facilitates transmission and reception of radio frequency signals to and from a wireless access network such as the Global System for Mobile communication (GSM). The details of this aspect of the mobile communication device 100 are well known and will not be described here except to say that the mobile communication device 100 is capable of accessing one or more wireless access networks.

A body structure 104 of the mobile communication device 100 houses a display unit 106 that is configured to display various types of information based on the operating mode of the mobile communication device 100. The display unit 106, as shown in FIG. 1, is partially covered and protected by a cover lid 108 attached to the body structure 104. A hinge 110 secures the cover lid 108 to the body structure 104 and allows the cover lid 108 to be selectively opened and closed by a user. A keypad having a plurality of mechanical keys, one of which is labeled here at 112, is mounted on the outer face of the cover lid 108. Note that the keys 112 are shown here in a raised or 3-D configuration to indicate the presence of actual keys 112, as opposed to mere key positions, which will be described later herein.

When the cover lid 108 is in the closed position, the keys 112 of the keypad face the user and are readily accessible to facilitate various applications. For example, the user may dial a telephone number by simply pressing the appropriate number keys 0–9, * and #. Menu features and other options of the mobile communication device 100 may be viewed on the display unit 106 by pressing the appropriate Up, Left, Down, and Right navigation keys. The Y and N keys allow the user to receive and terminate calls as well as make menu and service selections. It should be noted that the keys 112 shown in FIG. 1 are exemplary only, and that the invention is not to be limited thereto. Those of ordinary skill in the art will recognize that additional or fewer keys 112, as well as keys with corresponding functions but different labels, or keys with entirely different functions, may be used as needed. For example, instead of number keys 0–9, the keys 112 of the keypad may be alphabetic keys (e.g., A, B, C, etc.), or the keys 112 may include both letters and numbers.

Figure 2:
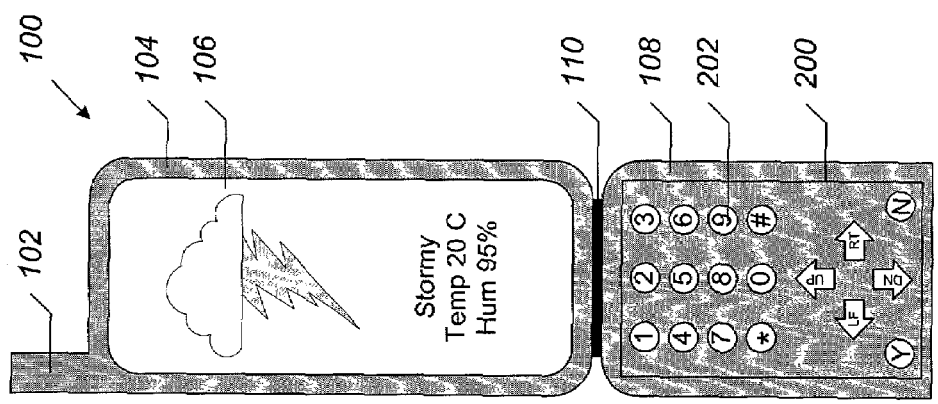
FIG. 2 illustrates the mobile communication device of FIG. 1 wherein the cover lid is in the open position.

FIG. 2 illustrates the mobile communication device 100 with the cover lid 108 in the open position. The display unit 106 is now fully uncovered, and the mobile communication device 100 is ready to be used for, for example, computing and networking applications. With the cover lid 108 opened thusly, a graphical layout or template 200 of the keys 112 can be seen on an inner face of the cover lid 108, in accordance with some embodiments of the invention. The layout or template 200 shows the exact position 202 of the keys 112 as they are actually and physically located on the other side (outer face) of the cover lid 108. Moreover, the layout or template 200 shows the values or functions that are represented by the keys 112 when the mobile communication device 100 is operating in the computing and networking mode, that is, when the cover lid 108 is in the open position. Such an arrangement not only helps the user to reach the desired key, but a set of values or functions more in line with the intuitive expectations of the user may also be assigned to the keys 112, as shown in the layout or template 200.

In this exemplary embodiment, the positions of the keys 112 have been rotated by 180 degrees relative to the position of the keys 112 when the cover lid 108 is in the closed position (see FIG. 1), based on the assigned values. Specifically, the Up and the Down navigation keys have been swapped, as well as the first and fourth rows, and second and third rows of the numerical keys. The Left and Right navigation keys, and the Y and N keys retain their original representation.

FIG. 3 illustrates another mobile communication device 300 having another layout or template 302 according to some embodiments of the invention. The layout or template 302 shows the position 304 of the keys 112 as having been rotated by 90 degrees relative to the position of the keys 112 when the cover lid 108 is in the closed position (see FIG. 1), based on the assigned values. This arrangement allows the keys 112 to be aligned with the display unit 106, which has also been rotated by 90 degrees. Note in the layout or template 302 of FIG. 3 that only a portion of the keys 112 are being used in the open cover lid mode. Specifically, the *, 0, and # keys are omitted here to indicate they are not being used. In general, any key may be omitted or included in the layout or template 302 as needed depending on the particular requirements of the application. Thus, in some embodiments, only the navigation keys may be used, or only the number keys may be used.

In some embodiments, pointing devices (not shown) such as joysticks or trackballs may be used to navigate through the menu features and options of the mobile communication instead of the navigation keys. In these embodiments, the values and functions of the pointing devices may be assigned and reassigned in a similar manner as the navigation keys.

In some embodiments, the graphical layout or template may be a printed pattern on the inner face of the cover lid 108. In other embodiments, however, the layout or template may be an illuminated pattern that is turned on only when the cover lid 108 is in the open position. In still other embodiments, the layout or template may be selectively illuminated by the user upon pressing an appropriate actuator (not shown).

Figure 4:
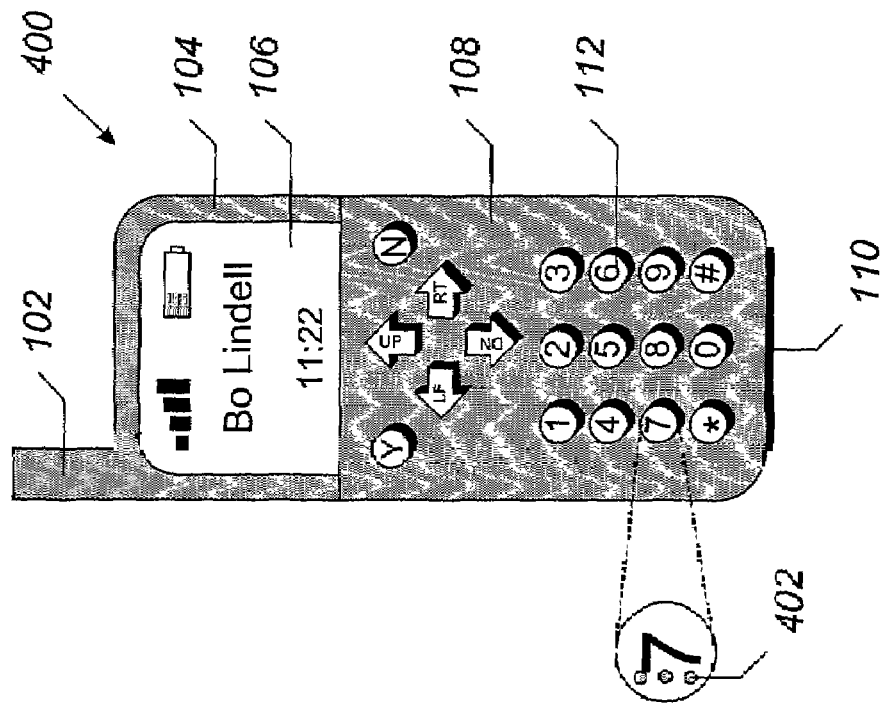
FIG. 4 illustrates yet another mobile communication device according to some embodiments of the invention.

Referring now to FIG. 4, in some embodiments, instead of a graphical layout or template, the values or function to be represented by the keys 112 when the cover lid 108 is in the open position may be indicated in the form of tactile indicators 402 such as bumps or raised portions on the surface of the keys. As can be seen in the close-up of the number 7 key, three raised bumps indicate that this key represents the number 3 when the mobile communication device 400 is operating in the computing and networking mode (i.e., when the cover lid 108 is open). In some embodiments, instead of a simple bump count, the tactile indicators 402 may be in the form of raised symbols or characters such as Braille characters and the like.

While the templates (and tactile indicators) are obviously helpful, they are in no way necessary or required to practice the invention. Thus, in some embodiments, the values or functions of the keys are reassigned upon the occurrence of some predetermined event (e.g., opening the cover lid), but without the use of the templates to indicate the reassigned values, functions, or positions. Such an arrangement allows the user to use the inner surface of the cover lid 108 for other purposes such as when the mobile communication device is to be used as a notepad or whiteboard.

Figure 5:
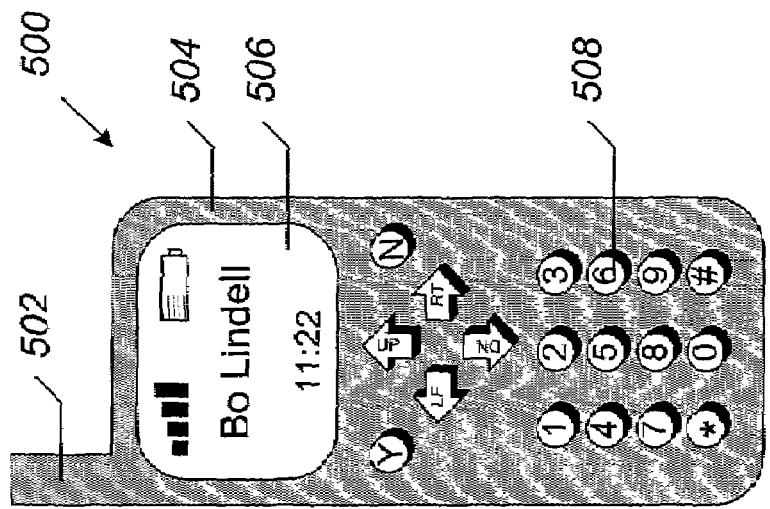
FIG. 5 illustrates yet another mobile communication device according to some embodiments of the invention.

Moreover, in some embodiments, the mobile communication device does not have a cover lid at all. As shown in FIG. 5, the mechanical keys 508 may be mounted directly on the body structure 504 of the communication device 500 instead. In that case, reassignment of the values or functions of the keys may occur when a certain key has been pressed, or when several keys are pressed. Alternatively, reassignment of the values or functions of the keys 508 may occur when certain modes or applications of the mobile communication device have been activated. In some embodiments, a pogo pin may be used as the mechanism that triggers the reassignment of the keys 508 instead of one of the keys. Finally, although the foregoing features were described with respect to mobile communication devices without cover lids, those of ordinary skill in the art will recognize that the described features are equally applicable to mobile communication devices that have cover lids.

Figure 6:
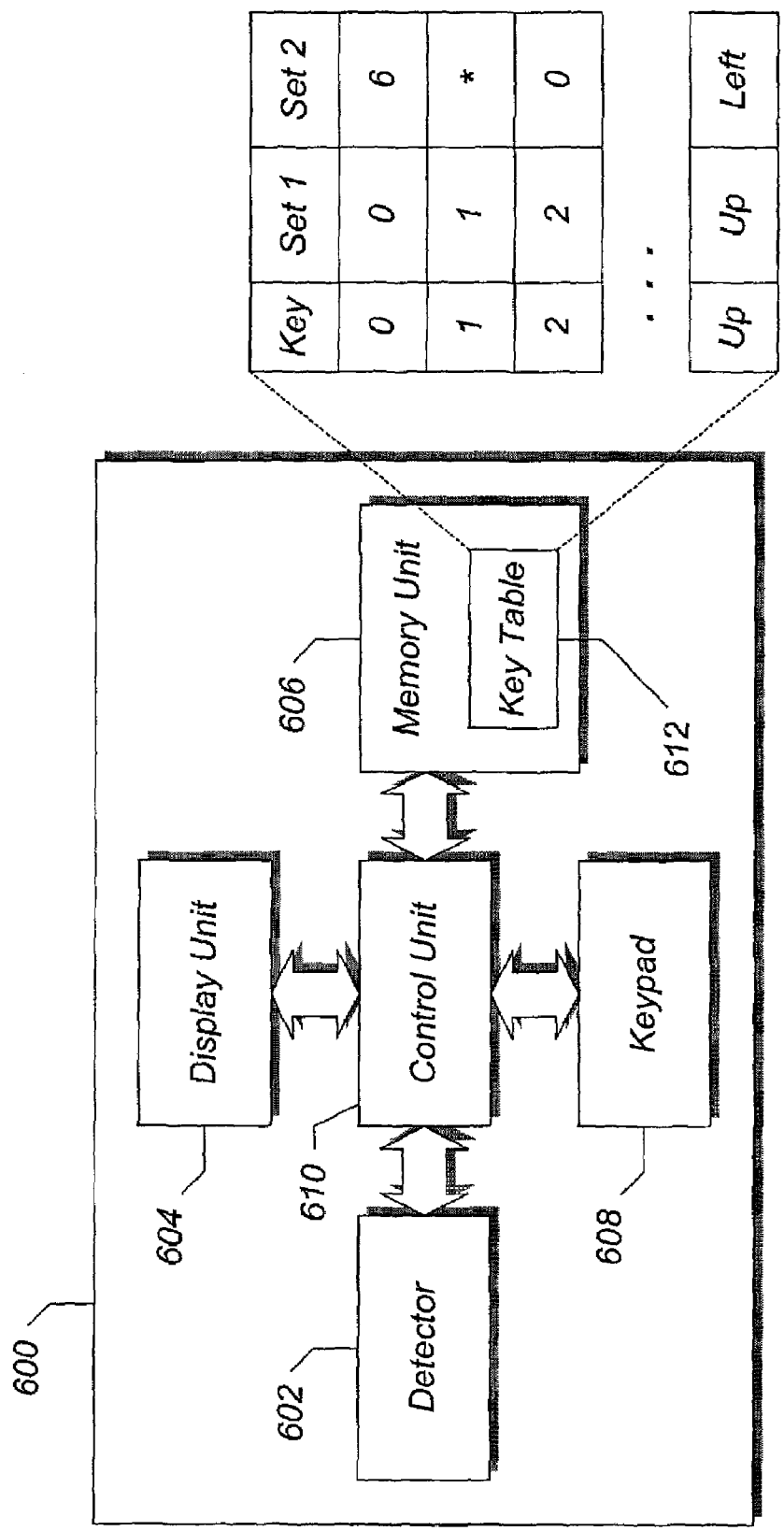
FIG. 6 illustrates a functional block diagram of a mobile communication device according to some embodiments of the invention.

A functional block diagram of a mobile communication device according to some embodiments of the invention is shown in FIG. 6. The mobile communication device 600 has a number of functional components including a detector 602, a display unit 604, a memory unit 606, a keypad 608, and a control unit 610, all interconnected as shown. Of course, those of ordinary skill in the art will recognize that the invention is not to be limited to the above functional components, and that other functional components may be added as needed.

The detector 602 is capable of detecting whether a certain event has happened to trigger reassigning the values or functions of the keys on the mobile communication device. In some embodiments, the detector 602 is an electronic switch mounted in the hinge of the mobile communication device that detects when a cover lid is closed or open and outputs an appropriate signal. In other embodiments, the electronic switch may be connected to one or more of the keys of the mobile communication device. In still other embodiments, the detector 602 may include circuitry connected to a pogo pin and configured to detect the pressing and releasing thereof. In still other embodiments, the detector 602 may include a software algorithm that is executed to detect when a certain key is pressed, or when certain modes or applications are initiated.

The display unit 604 may be any display unit 604, such as a liquid crystal display, that is capable of displaying graphical and textual information for the mobile communication device.

The keypad 608 is a conventional keypad 608 having a plurality of mechanical keys similar to the keypads found in commonly available mobile communication devices. The memory unit 606 is configured to store data and information needed for the operation of the mobile communication device 600. In some embodiments, the memory unit 506 includes a key table 612 having at least a first set of values or functions (Set 1) and a second set of values or functions (Set 2) to be represented by the keys corresponding to whether a certain event has occurred. As can be seen in the blow-up of the key table 612, each key has a corresponding value or function to be assigned depending on whether the triggering event has occurred, for example, whether the cover lid is closed or open. In the specific embodiment show in FIG. 6, the second set of values or functions to be assigned when the cover lid is open results in the position of the keys being rotated by 180 degrees relative to the position of the keys when the first set of values is to be assigned (i.e., when the cover lid is closed). Examples of the memory unit 606 include RAM, ROM, magnetic media, optical media, and the like.

The control unit 610 has primary responsibility for the operation of the mobile communication device. In some embodiments, the control unit 610 is configured to assign either the first set of values or functions, or the second set of values or functions, to be represented by the keys depending on the detection by the detector 602. Thus, for example, when the cover lid is detected to be in the closed position, the control unit 610 assigns the first set to the keys, and when the cover lid is detected to be in the open position, the control unit 610 assigns the second set to the keys. Examples of the control unit 610 include a microcontroller, a microprocessor, an ASIC, and other similar control units.

Figure 7:
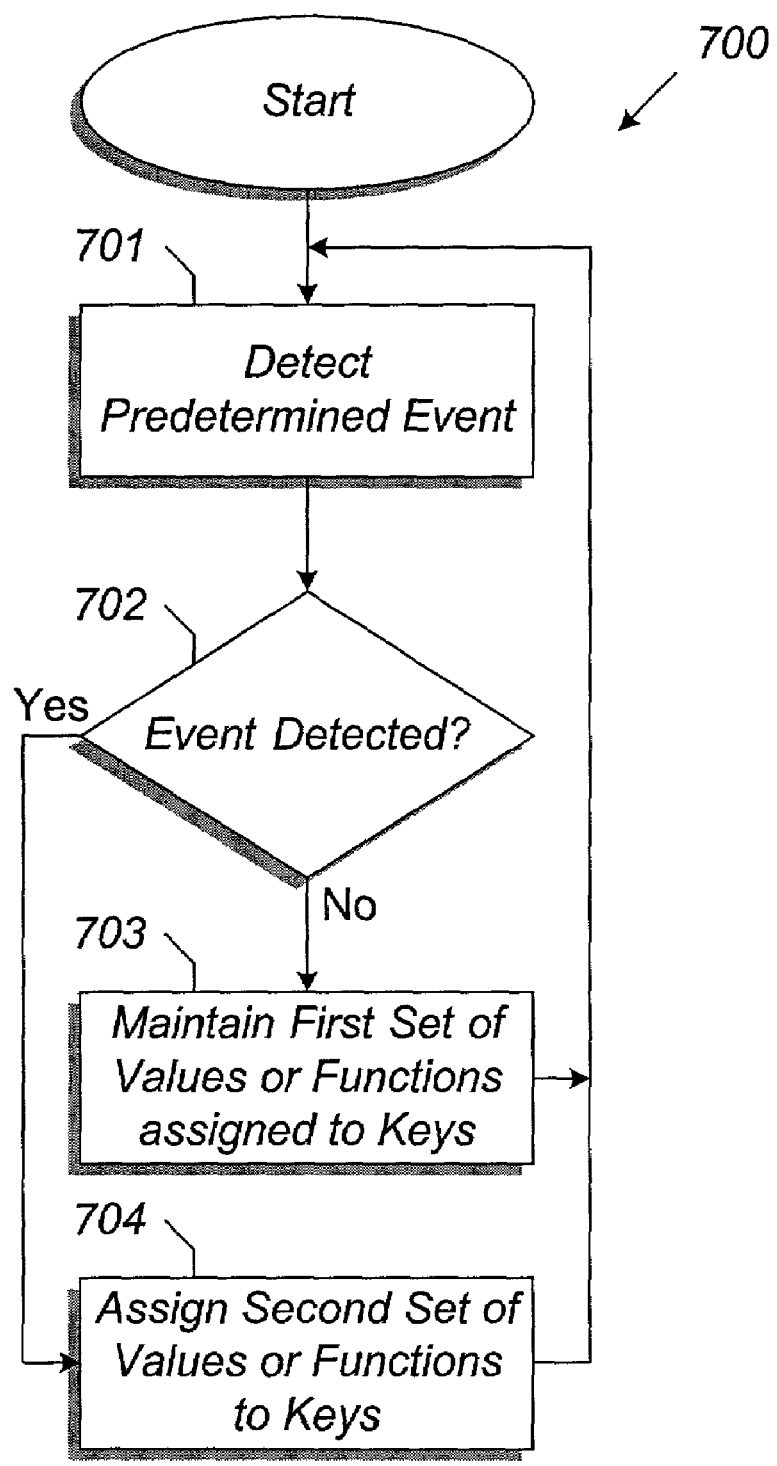
FIG. 7 illustrates a flowchart of a method according to some embodiments of the invention.

FIG. 7 illustrates a flowchart of a method 700 for assigning values or functions to be represented by the keys of a keypad on a mobile communication device. The method begins at step 701 wherein ongoing detection of certain events is performed. A determination is made at step 702 as to whether the event has happened (e.g., the cover lid has been closed). If no, a first set of values or functions is maintained as being assigned to be represented by the keys at step 703. If yes, a second set of values or functions is assigned to be represented by the keys at step 704. In either case, the method returns to step 701 after the key assignments have been maintained or made in order to continue to detect for the occurrence of the events.

As demonstrated above, embodiments of the invention provide an improved method and apparatus for keypad representation in a mobile communication device. Those of ordinary skill in the art will recognize that variations and modifications from the described embodiments may be derived without departing from the scope of the invention. All numerical values disclosed herein are approximate values only regardless of whether that term was used in describing the values. Moreover, unless otherwise specified, the steps of any methods described herein can be practiced in any order or sequence, and some steps can be omitted, combined into a single step, or divided into several substeps. Accordingly, the appended claims are intended to cover all such variations and modifications as falling within the scope of the invention.

What is claimed is:

1. A method of assigning functions to be represented by the keys of a keypad on a cover lid of a mobile communication device, the method comprising:

detecting whether the cover lid is in a first position or a second position;

assigning, by the control unit a first set of active functions to be represented by the keys when the cover lid is detected in the first position; and assigning a second set of active functions to be represented by the keys when the cover lid is detected in the second position; and wherein the first set of active functions and the second set of active functions are stored in a key table within a memory.

2. The method according to claim 1, further comprising displaying a graphical template of the keys on an inner face of the cover lid, the template showing a position of the keys and the second set of active functions to be represented by the keys.

3. The method according to claim 1, wherein assigning the second set of active functions results in a position of at least two of the keys being swapped relative to assigning the first set of active functions.

4. The method according to claim 1, wherein assigning the second set of active functions results in a position of the keys being rotated by 90 degrees relative to assigning the first set of active functions.

5. The method according to claim 1, wherein assigning the second set of active functions results in a position of the keys being rotated by 180 degrees relative to assigning the first set of active functions.

6. The method according to claim 1, wherein the second set of active functions includes a null value to be represented by at least one key.

7. The method according to claim 1, further comprising indicating on a surface of the keys the second set of active functions.

8. The method according to claim 7, wherein the indicating step includes forming raised symbols on the surface of the keys.

9. The method according to claim 7, wherein the indicating step includes forming Braille characters on the surface of the keys.

10. A mobile communication device having a keypad and keys mounted on a cover lid, comprising:
    a memory unit configured to store a first set of active functions and a second set of active functions to be represented by the keys in a table;
    a detector unit capable of detecting a movement of the cover lid from a first position to a second position; and
    a control unit connected to the memory unit and the detector unit, the control unit configured to assign the first set of active functions to the keys when the cover lid is detected in the first position, and to assign the second set of active functions to the keys when the cover lid is detected in the second position.

11. The mobile communication device according to claim 10, further comprising a graphical template of the keys displayed on an inner face of the cover lid, the template showing a position of the keys and the second set of active functions to be represented by the keys.

12. The mobile communication device according to claim 10, wherein assignment of the second set of active functions results in a position of at least two of the keys being swapped relative to assignment of the first set of active functions.

13. The mobile communication device according to claim 10, wherein assignment of the second set of active functions results in a position of the keys being rotated 90 degrees relative to assignment of the first set of active functions.

14. The mobile communication device according to claim 10, wherein assignment of the second set of active functions results in a position of the keys being rotated 180 degrees relative to assignment of the first set of active functions.

15. The mobile communication device according to claim 10, wherein the second set of active functions includes a null value to be represented by at least one key.

16. The mobile communication device according to claim 10, wherein a surface of the keys includes tactile indicators of the second set of active functions.

17. The mobile communication device according to claim 16, wherein the tactile indicators include raised symbols.

18. The mobile communication device according to claim 16, wherein the tactile indicators include Braille characters.

19. A keypad for a mobile communication device, comprising:
    a plurality of mechanical keys mounted on the keypad and capable of performing a first set of active functions and a second set of active functions;
    the plurality of mechanical keys configured to perform the first set of active functions when a predetermined event has not occurred; and
    the plurality of mechanical keys configured to perform the second set of active functions when the predetermined event has occurred; and
    wherein the keypad is adapted to be connected to the mobile device, the mobile device comprising:
        a memory unit configured to store the first set of active functions and the second set of in a key table; and
        a control unit connected to the memory unit, the control unit configured to assign the first set of active functions to the plurality of mechanical keys when the predetermined event has not occurred, and to assign the second set of active functions to the plurality of mechanical keys when the predetermined event has occurred.

20. The keypad according to claim 19, wherein the mechanical keys include numeric keys.

21. The keypad according to claim 19, wherein the mechanical keys include alphabetic keys.

22. The keypad according to claim 19, wherein the mechanical keys include alpha-numeric keys.

23. The keypad according to claim 19, further comprising a pointing device capable of performing a first set of active functions and a second set of active functions; the pointing device configured to perform the first set of active functions when the predetermined event has not occurred; and the pointing device configured to perform the second set of active functions when the predetermined event has occurred.

24. The keypad according to claim 19, wherein the predetermined event includes pressing one or more predefined keys.

25. The keypad according to claim 19, wherein the predetermined event includes initiating one or more predefined applications in the mobile communication device.

26. The keypad according to claim 19, further comprising a cover lid, wherein the predetermined event includes opening the cover lid.

27. The method according to claim 1, wherein the first set of active functions generate numeric character representations and the second set of active functions generate alphabetic character representations.

28. The method according to claim 1, wherein the first set of active functions generate numeric character representations and the second set of active functions generate alphanumeric character representations.

29. The mobile communication device according to claim 10, wherein the first set of active functions generate numeric character representations and the second set of active functions generate alphabetic character representations.

30. The mobile communication device according to claim 10, wherein the first set of active functions generate numeric character representations and the second set of active functions generate alphanumeric character representations.

* * * * *

UNITED STATES PATENT AND TRADEMARK OFFICE
CERTIFICATE OF CORRECTION

PATENT NO. : 7,054,440 B2  Page 1 of 1
APPLICATION NO. : 09/976834
DATED : May 30, 2006
INVENTOR(S) : Swerup et al.

It is certified that error appears in the above-identified patent and that said Letters Patent is hereby corrected as shown below:

In Column 7, Line 29, in Claim 10, after "a" insert -- key --.

In Column 8, Line 16, in Claim 19, after "of" insert -- active functions --.

Signed and Sealed this

Eighteenth Day of December, 2007

JON W. DUDAS
*Director of the United States Patent and Trademark Office*